Oct. 10, 1939. F. M. SMITH Re. 21,231

VEHICLE DOOR MOUNTING

Original Filed Sept. 5, 1935 2 Sheets-Sheet 1

Inventor
Frank M. Smith
By Gilson, Mann & Cady
Attys

Oct. 10, 1939. F. M. SMITH Re. 21,231
VEHICLE DOOR MOUNTING
Original Filed Sept. 5, 1935 2 Sheets-Sheet 2
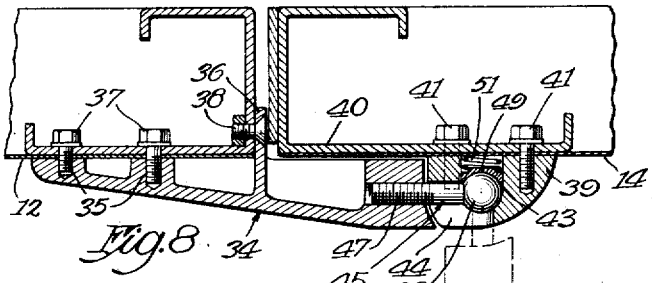
Fig. 8
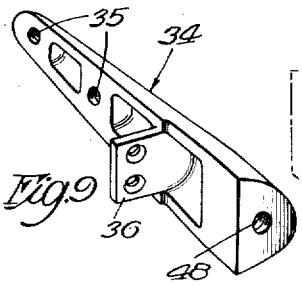
Fig. 9
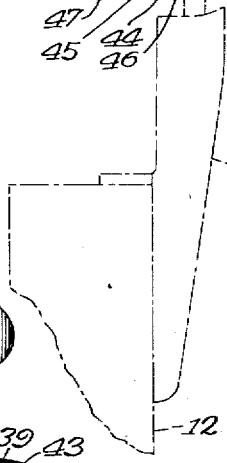
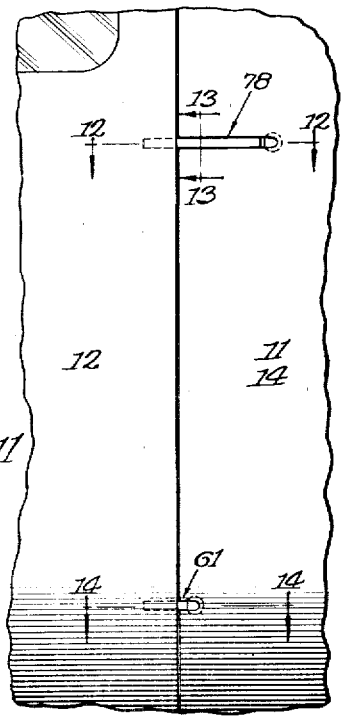
Fig. 11
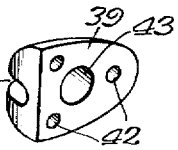
Fig. 10
Fig. 12
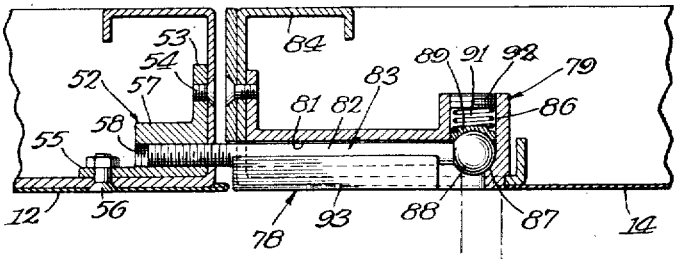
Fig. 13
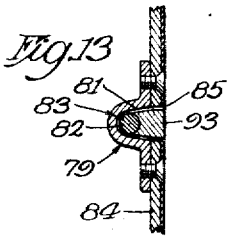
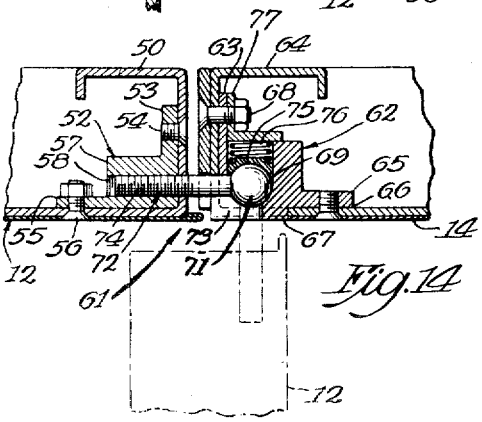
Fig. 14
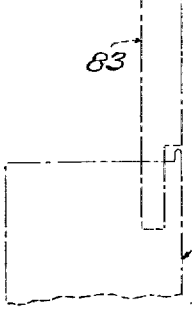
Inventor
Frank M. Smith
By Gilbert, Harman & Gilbert
Attys.

Reissued Oct. 10, 1939

Re. 21,231

UNITED STATES PATENT OFFICE 21,231

VEHICLE DOOR MOUNTING

Frank M. Smith, Dearborn, Mich., assignor, by mesne assignments, to The Atwood Vacuum Machine Company, Rockford, Ill., a copartnership composed of James T. Atwood and Seth B. Atwood Original No. 2,050,469, dated August 11, 1936, Serial No. 39,307, September 5, 1935. Application for reissue August 11, 1938, Serial No. 224,409

24 Claims. (Cl. 296—44)

This invention relates to motor vehicles, and more particularly to novel hinge mechanism for mounting the doors on the bodies.

The principal object of this invention is to provide new and improved universal joint type hinge mechanism, or more specifically ball and socket type hinge mechanism, for supporting the doors on a vehicle body, each hinge of the present type providing a point suspension and two such hinges on a door establishing the hinge axis therefor as the line passing through the two points of hinge suspension, whereby to eliminate the problems connected with securing even approximate alignment of pintles on the old style of hinges, and to avoid excessive wear and consequent rattling of doors due to misalignment of hinge pintles, and generally facilitate the assembling and centering and truing up of doors on vehicle bodies.

Another object of the invention is the provision of a new and improved hinge mechanism especially adapted for mounting the doors on vehicle bodies having curvilinear sides as provided on the later streamlined designs, in such a manner that the doors will swing free of the adjacent curved edges of the vehicle body and doorway.

Further objects are the provision of a new and improved hinge mechanism for vehicle doors and the like that is inexpensive to manufacture, efficient in use, and may be adjusted so as to center and align the doors with respect to the vehicle bodies, without cramping the hinges.

Other and further objects and advantages of the invention will appear from the following description taken in connection with the accompanying drawings which disclose embodiments of the invention by way of example and in which:

Fig. 8 is a section of the upper hinge member on the line 8—8 of Fig. 2;

Figs. 9 and 10 are each perspective views of the hinge plates of the upper hinge member;

Fig. 11 is a side elevation of a portion of a door and body showing a modified form of hinge mechanism;

Fig. 12 is a section on the line 12—12 of Fig. 11;

Fig. 13 is a section on the line 13—13 of Fig. 11; and

Fig. 14 is a section on the line 14—14 of Fig. 11.

Figure 1:
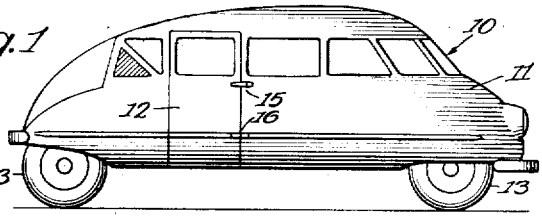
Fig. 1 is a side elevation of a motor vehicle with the invention in position thereon.
Figure 2:
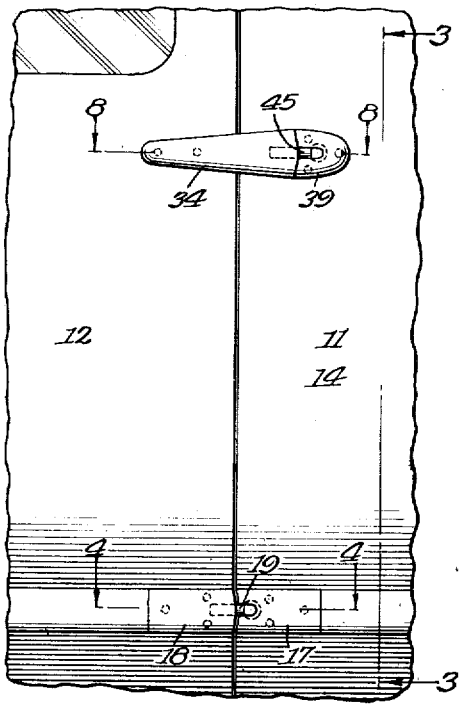
Fig. 2 is a side elevation of a hinge edge portion of the door and the body to which the hinge mechanism is attached with parts broken away and on an enlarged scale and showing the door in closed position.
Figure 3:
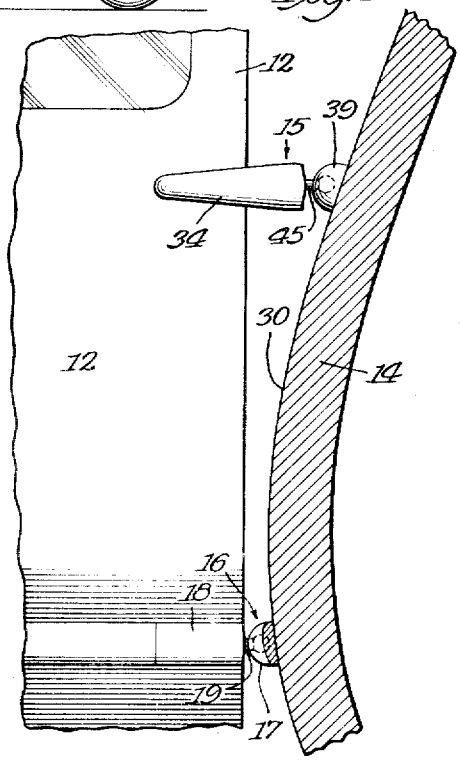
Fig. 3 is a section on the line 3—3 of Fig. 2 and showing the door in open position and with parts broken away.

In mounting doors on curvilinear or irregular surfaces, as automobile bodies and the like, great difficulty has been experienced in so mounting the hinges that they will not bind and prevent the doors from opening properly. It is common practice to use hinges of the pintle type in mounting the doors on vehicle bodies, but such hinges require the pintles to be in alignment, and on the modern vehicle bodies that usually means one or more of the hinges must extend laterally outward beyond the surface of the body to such an extent as to give an objectionable appearance and also afford considerable air resistance to the rapid transit of the vehicle.

The present invention seeks to overcome these difficulties by the provision of hinges that do not require the attaching surfaces of the vehicle to be in a common plane but may be attached to surfaces in planes arranged at angles to each other, and which, by reason of their providing point suspensions avoid the problems of pintle alignment, but do not extend outwardly an objectionable distance from the surface to which they are attached. Or, if desired, these hinges may be housed entirely within such surface, thereby minimizing or entirely avoiding resistance to the air on moving vehicles.

Referring now to the drawings, the reference character 10 designates a motor vehicle having a streamline body 11, a door 12 and supporting wheels 13. The side walls 14 of the body may be curvilinear on their outer surface and the body may be ovate in cross section.

While the surface of the body and the door to which the hinge mechanism is secured is shown as being curvilinear, it is understood that they may be of any other suitable contour.

Suitable hinge mechanism is provided for hingedly connecting the door to the body so that the door will be free to swing for opening the same. In the form of the construction selected to illustrate an embodiment of the invention, a plurality of hinge members are provided which are attached to the adjacent edges of the door and body adjacent the door opening.

For the purpose of illustrating the invention, two hinge devices are shown and will be described for hingedly connecting the door to the body—an upper hinge member 15 and a lower hinge member 16.

Figure 4:
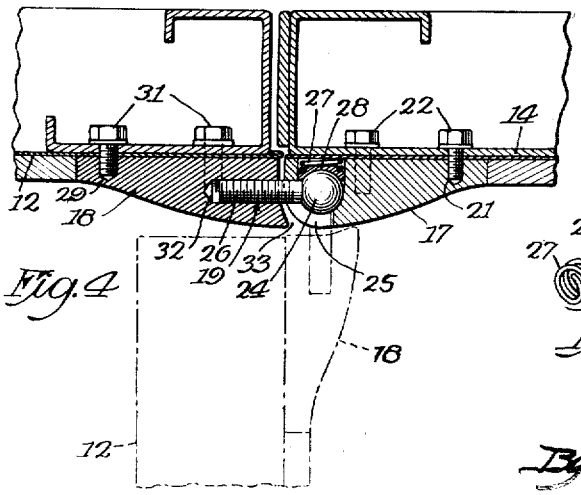
Fig. 4 is a section of the lower hinge member on the line 4—4 of Fig. 2.
Figure 5:
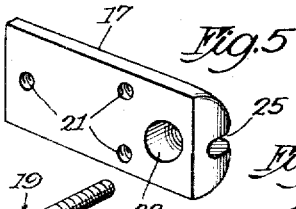
Fig. 5 is a perspective view of one of the hinge plates.
Figure 7:
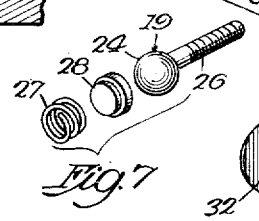
Fig. 7 is a perspective view of the joint mechanism showing the parts separated for the sake of clearness.
Figure 6:
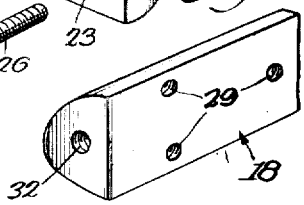
Fig. 6 is a perspective view of the cooperating hinge plate.

The lower hinge member 16 comprises a body attaching plate 17, a door attaching plate 18 and a connecting member 19. The body attaching plate 17 is flat on its inner side for engaging the side of the body and may be a casting provided with a plurality of threaded openings 21 on its inner surface in which cap screws 22 extend through the body wall for clamping the plate to the body, as shown more clearly in Fig. 4.

The outer surfaces of the plate 17 is streamlined, as are all the other hinge plates, by being curved both longitudinally and transversely. The portion of the plate adjacent to the door, which—for convenience of description—will be termed the rear end of the plate, is provided with a socket 23 for receiving the spherical head 24 of the connector member 19. A slot 25 on the outer and rear surfaces of the plate 17 is in communication with the socket 23 through which the shank 26 of the connector member 19 extends. In order to hold the head 19 in the bottom of the socket 23, and for preventing looseness and rattling of the parts, a spring 27 and a cap 28 are introduced between the wall and the plate 14. The outer end of the shank 26 is screw threaded for engaging the cooperating hinge plate 18, as will presently appear.

The hinge plate 18 may also be cast and is preferably provided with screw threaded openings 29 which are adapted to be engaged by studs 31 for clamping the plate to the body. The forward end of the hinge plate 18 is provided with a threaded opening 32 in which is adjustably mounted the shank 26 of the connector 19. The meeting ends of the hinge plates may be complementary curved, as shown at 33 in Fig. 4, for making a close joint and permitting the opening of the door.

The upper hinge member is similar to the lower but differs from it in that the hinge plate attached to the door extends over the edge of the body to compensate for the ovate form of the body wall. Its length will depend on the curve 30 of the body wall between the hinges. It must be sufficiently long that when the door is opened, it may move outwardly to free the curved surface 30 of the body.

The upper hinge comprises a hinge plate 34 which may also be cast and is provided with a plurality of threaded openings 35 in its outer end which are adapted to be engaged by studs 37 extending through the frame of the door 12 for clamping the hinge plate thereto. The plate may be, and preferably is, provided with a flange 36 which is adapted to engage the front edge of the door and is secured thereto by a plurality of fastening members, such as the bolts 38, extending through the door frame. The hinge member is also provided with a hinge plate 39 which is attached to the side wall and frame member 40 of the car by suitable fastening means, as the studs 41, which extend through the side wall and engage threaded openings 42 in the hinge plate. The hinge plate is provided with a socket 43 similar to the socket 23 of the hinge plate 17 and with a slot 44 of less width than the diameter of the socket 43. A connector member 45 has a spherical head 46 engaging in the socket 43 and is provided with a threaded shank 47 which is adapted to engage a threaded opening 48 in the forward end of the hinge plate 34. The head 46 is held in the bottom of the socket 43 by a spring-pressed cap 49 which has a concave surface for engaging the spherical head 46. A spring 51 is compressed between the body wall and the cap 49 when the hinge plate is secured in position on the body wall.

In assembling the hinge devices, the connector members 19 and 45 are placed in position by inserting the shanks through the sockets and slots from the inner side before the plates are attached to the body walls. The hinge plates 18 and 34 are then attached to the shanks of the connector member and the hinge members connected to the door and body walls. The hinge sections may be adjusted by threading the shanks in or out of the hinge plates, so as to center the door in the door opening in the body. Manifestly, since the ball heads on the ends of the shanks working in their sockets with a swivel action form universal joints, each of which provides a single point suspension, the adjustment of the shanks does not interfere with the easy swinging movement of the door, whereas with the old combination pintle type hinges, any adjustment of the hinges to center and true up a door invariably resulted in misalignment of the pintles, and such misalignment made for resistance to the opening and closing movements of the door and caused premature wearing of the pintles and rattling of the doors. Misalignment of pintles also was evidenced by the tendency of the pintles to work upwardly out of the knuckles, as is well known. With the hinges of my invention it requires less skill on the part of the workmen and much less time to assemble a door on a body, and the door swings freely regardless of whatever adjustments have been necessary in the centering and truing up of the door, and there is no noticeable wear on the hinge parts and consequently no tendency for the door to rattle.

The form of the construction shown in Figs. 11 to 14, inclusive, differs from that described above in that, instead of attaching the hinge members to the outer surface of the body walls, provision is made for securing the hinge members within the contour of the body walls. In the form of construction shown, which is by way of example only, these hinge devices each comprise a door attaching plate 52 which is in the form of an angle having a flange 53 extending along the forward edge of the door on the inner side of the frame 50 and is secured thereto with a fastening means 54. The plate is also provided with a flange 55 which is secured to the door or door frame as by means of the bolt 56 or other suitable fastening means. The plate is provided with a boss 57 having a screw threaded opening 58.

The upper and lower hinges differ in detail of construction due to the contour of the body and door on which they are used. In the form of the construction shown, the lower hinge device 61 is provided with a hinge plate 62 which is adapted to be connected to the body wall or frame 64. The plate 62 is provided with a flange 63 extending inwardly along the inner face of the frame 64 for the door opening and with a flange 65 which is adapted to be connected to the body wall. The plate 62 is rabbeted, as at 66, on its outer surface, providing an extension 67 which is adapted to extend outwardly through an opening in the body wall so that its outer surface is flush with said body wall, as shown more clearly in Fig. 14. The flange 63 is connected to the frame 64 by suitable fastening means, such as the bolt 68. The plate 62 is provided with a socket 69 for receiving a spherical head 71 of the connector member 72. The plate is also provided with a slot 73 in connection with the socket 69 and through which the threaded shank 74 of the connector member 72 is adapted to extend. The head 71 is held in the bottom of the socket by a cap 75 which is compressed downwardly against the head by a spring 76 located in the opening leading to the socket. The spring is held compressed by an angle bar 77 which may be secured in position across the opening by the bolt 68, as clearly shown in Fig. 14.

The upper hinge 78 is provided with a plate member 79 having a recess 81 in its outer surface (see Fig. 13) for receiving the shank 82 of the connector member 83. This plate is secured to the inner surface of the body wall, and the body wall and the reinforcing frame member 84 are slotted, as at 85 (Fig. 13) in alignment with the depression 81, through which a shank 82 of the connector member 83 is adapted to pass when the door is opened or closed. The hinge plate 79 has an enlargement at its forward end and is provided with a bore 86, terminating in a socket 87 for receiving the spherical head 88 of the connector member 83. The head 88 is held in the socket by a cap 89 which is engaged by a spring 91 and held in position by a plug 92 threaded in the outer end of the bore 86.

The rear end of the connector member 83 is screw threaded and engages the threaded opening 58 in the hinge plate 52.

In order to close the slot 85 when the door is closed, the connector member 83 may be provided with a finishing strip 93 secured thereto in any suitable manner, the outer surface of which is flush with the outer surface of the body will when the door is closed.

The slots in the outer surfaces of the body hinge plates may extend through any desired number of degrees. As shown, they extend through approximately 90° and the outer ends of these slots constitute stops or shoulders for engaging the connector member for limiting the opening movement of the door.

By varying the relative lengths of the hinge plates and connector members, various characteristic door movements may be obtained. For instance, the plates and connector members may be so constructed and adjusted for bodies having walls and doors of any particular contour or shape that the axis about which the door hinges may be perpendicular or inclined forwardly, rearwardly or laterally relative thereto, whereby the door will tend to remain in any partly opened or wholly opened position or if inclined will tend to move to either opened or closed position, depending upon the direction of inclination of such axis. Since the turning movement is about ball and socket joints, it is not necessary that the hinge plates be attached to surfaces in a common plane as the plates may be attached to surfaces arranged at various angles within certain limits. This is considered an important feature of the invention since the necessity for close accuracy in attachment of the hinge is avoided.

It will be noted that in both forms of construction the body is ovate in cross section and the point where the upper hinge is applied is inward of the point of attachment for the lower hinge. It will also be seen that the doors may be opened through 90° only.

In order that the top and bottom edges of the door shall remain more nearly horizontal or parallel with the ground lever when the door is opened, the hinge joint of the upper hinge is offset longitudinally of the vehicle to compensate for this inward inclination of the hinge axis. The hinge axis of the door is, therefore, diagonally inclined, that is, it is inclined both transversely and longitudinally of the vehicle. As a result of this diagonal inclination of the hinge axis, the door, when opened, will, in theory, tend to close until it is turned to the neutral position in the vertical plane of the hinge axis and beyond that it tends to swing to open positon.

In practice, however, since the turning movement of the door is small at each side of the neutral position and zero at that position, the friction of the parts will retain the door in open or any partly-open position to which it may be moved.

If, after continued use, the door begins to sag, the difficulty may be remedied by shortening the effective length of the upper connector rod or by lengthening the effective length of the lower one. This may be readily accomplished by opening the door and adjusting the rod by the aid of a pipe wrench.

The hinge plates in the form of construction shown in Figs. 1 to 10 may be comparatively thin and their outer surfaces will be streamlined, that is, their forward portion may be more or less semi-bulbous, tapering toward their rear ends and curved transversely on their outer surfaces. In the form shown in Figs. 11 to 14, no part of the hinge extends laterally beyond the outer surface of the vehicle wall. In any event, the hinge does not protrude to such an extent as to constitute a serious obstruction to the smooth flow of air along the surface of the body at high speeds.

I claim as my invention:

1. In combination, a vehicle body having a curvilinear outer wall provided with an opening, a closure for said opening, and hinge members for said closure secured to the curved portions of said wall, each hinge comprising attaching plates connected together by a universal joint, one of said points being located to said body forwardly of the other.

2. In combination, a vehicle body provided with a wall having portions thereof in different planes, a door for said wall, and hinge members for connecting said door to said body to swing in a substantially horizontal plane, the portions of the body to which one of the hinge members is attached being in a plane at an angle to that to which another of said hinge members is attached.

3. In combination, a vehicle body provided with a side wall having portions thereof in different planes, a door for said wall, and hinge members connected to different portions of said wall extending in different planes, each of said hinge members being stream-lined and secured to the outer surface of said door and body, the junction between the hinge sections of one hinge member being spaced longitudinally of the body from that of the other.

4. In combination, a vehicle body, a door therefor, a pair of hinge members for each door, each member comprising a pair of comparatively thin plates rigidly secured to the door and to the adjacent wall of said body, and a connector member threaded into one of said plates and connected to the other by a universal joint.

5. In combination, a vehicle body, a door for said body, a pair of hinge members for hingedly supporting said door from said body, each hinge member comprising a body hinge plate secured to the body and having a ball socket therein and a groove on its outer surface in communication with said socket, a door hinge plate secured to said door adjacent to said body hinge plate, a connector member threaded into said opening and having a ball engaging said socket, and a spring-pressed cap for holding said ball in the bottom of said socket, said connector member engaging in said slot and contacting one end thereof for limiting the outward movement of said door.

6. In combination, a vehicle body, a door for said vehicle body, hinge means for connecting said door to said body, said means comprising hinge plates secured to the interior of said door and body, and a connector adjustably connected to one of said plates and hingedly connected to the other plate by a ball and socket joint.

7. In combination, a vehicle body, a door for said body, a pair of hinge members for said door, each hinge comprising body and door plates secured within said body and door, respectively, said body plate having a socket and a groove opening outwardly, said body having a slot in alignment with the groove, a connector member adjustably connected to said door plate and having a ball on its opposite end seated in said socket, the intermediate portion of said connector member being seated in said groove when the door is closed, and a finishing strip secured to said connector member for closing said slot.

8. In combination, a vehicle body having its upper portion tapered inwardly, a door therefor, hinge members for hingedly connecting said door to said body, each of said members comprising a body plate secured to said body, the plate for the upper hinge being secured to said tapered portion, a door plate secured to said door, and a connector fixed to the door plate and hingedly connected to said body plate, the hinge connection of the upper hinge member being spaced forwardly from that of the lower hinge member, whereby the door will tend to move to open position when released.

9. In combination, a vehicle body, a door therefor, hinge members for said door, one of said members comprising a body plate secured to the vehicle body, a door plate secured to the door, a connector screw threaded into said door plate and having a spherical end engaging in a socket in the body plate extending through the outer wall of the door and engaging the door plate for clamping the same to the outer surface of the door, a flange on said plate engaging the edge of said door, and means for clamping said flange to the edge of said door.

10. A hinge comprising a pair of attaching plate members, each member having a plate face provided with threaded openings therein for attaching the same to a support, one of said members having a threaded opening therein and the other having a socket therein, and a connector member having one end thereaded in said opening and having its other end seated in said socket and means including a resilient element for engaging said other end for preventing rattling and to compensate for wear of the parts.

11. In a hinge for use on vehicle doors, a pair of attaching plates, one of said plates having a socket therein, a groove on its outer surface in communication with said socket, a connector member having a spherical head engaging in said socket, said member having a shank extending through said socket along said groove and adjustably connected to the other plate, and a spring-pressed cap for holding said head in said socket, said cap and spring being inwardly of said head, whereby the cap and spring are concealed when the hinge is applied.

12. In combination, a vehicle body ovate in cross section, a door for said body, upper and lower hinges for hingedly connecting said door to said body, the axis of the joints of said hinges extending diagonally inward whereby said door will tend to close when released at one side of the neutral position of said door, and will tend to open when at the opposite side of the neutral position.

13. A pair of ball and socket hinges for mounting a door on a vehicle body, the door and body having correspondingly curved external surfaces and the door being adapted to fit an opening in the body with small clearance so as to permit only small scale shifting of the door in the opening in assembling the door on the body, each hinge comprising a socket member and a ball-head member, one of which members is adapted to be secured to the door and the other to the body adjacent the door opening therein, the ball-head member comprising a substantially horizontally disposed shank with a ball head on one end thereof operating in the socket of the socket member with a swivel action, the other end of the shank being the attaching end, and means for securing the attaching ends of said shanks to one of said door and body for horizontal endwise adjustment thereof in horizontal adjustments of the door.

14. A pair of adjustable hinges for mounting a door on a vehicle body having corresponding outside curvature, the door being adapted to fit an opening in the body with small clearance so as to permit only small scale shifting of the door in the opening in assembling the door on the body, each hinge comprising two members interconnected by a universal joint for swinging movement with respect to one another, one of said hinge members being adapted to be secured to the door and the other to the body adjacent to the door opening therein, one of said hinge members comprising a substantially horizontally disposed shank connected to the universal joint at one end thereof for universal pivotal action with respect to the other member, the other end of the shank being the attaching end, and means for securing the attaching ends of said shanks to one of said door and body for horizontal endwise adjustment thereof in horizontal adjustments of the door.

15. In combination, a vehicle body having a door opening provided therein, a door adapted to close said opening, said door and body having corresponding outside curvature and the door being adapted to fit said opening with small clearance so as to permit only small scale adjustment of the door in the opening in assembling the door on the body, and a pair of vertically spaced hinges for hingedly connecting the door to the body so as to permit such adjustment without causing the door to bind at the hinges in opening and closing, each of said hinges comprising two members interconnected and providing a universal joint connection between the door and body, the two universal joint connections so provided establishing an upright hinging axis for the door, which axis is on a line passing through the two points of hinge suspension, the hinge members on the door being adjustable relative thereto and projecting from the edge of the door to locate the two points of hinge suspension outwardly relative to the edge of the door so that the hinging axis determined by these two points is laterally spaced relative to the edge of the door, and said universal joint connections being constructed so as to operate without binding irrespective of a change in the relationship of the door to the axis due to an adjustment of either or both of said hinges.

16. In combination, a vehicle body having a door opening provided therein, a door adapted to close said opening, said door and body having corresponding outside curvature and the door being adapted to fit said opening with small clearance so as to permit only small scale adjustment of the door in the opening in assembling the door on the body, and a pair of vertically spaced hinges for hingedly connecting the door to the body so as to permit such adjustment without causing the door to bind at the hinges in opening and closing, each of said hinges comprising two members having attaching ends projecting into the interior of the door and body, respectively, whereby when the door is closed the exterior thereof lies substantially flush with the exterior of the body, said members of said hinges being interconnected and providing two universal joint connections between the door and body at the two hinges, which together establish an upright hinging axis for the door relative to the body on a line passing through the two points of hinge suspension, the hinge members on the door being adjustable relative thereto and projecting from the edge of the door to locate the two points of hinge suspension outwardly relative to the edge of the door so that the hinging axis determined by these two points is laterally spaced relative to the edge of the door, and said universal joint connections being constructed so as to operate without binding irrespective of a change in the relationship of the door to the axis due to an adjustment of either or both of said hinges.

17. A pair of ball and socket hinges for mounting a door on a vehicle body, said door and body having corresponding outside curvature, each hinge comprising a socket member secured to the body at a point adjacent the door opening therein and a ball head member comprising a substantially horizontally disposed shank with a ball head on one end thereof operating in the socket of the socket member with a swivel action, the other end of the shank being the attaching end and disposed in the plane of the door substantially parallel with the outside surface thereof, and means for securing the attaching ends of said shanks to the door with freedom for rotary and endwise adjustment thereof relative to the door.

18. A pair of exposed ball and socket hinges for mounting a door on a vehicle body, said door and body having corresponding outside curvature, each hinge comprising a socket member secured to one of said door and body and a ball head member comprising a substantially horizontally disposed shank with a ball head on one end thereof operating in the socket of the socket member with a swivel action, the other end of the shank being the attaching end, the attaching end adapted to be secured to the other of said door and body, and means for securing the attaching ends of said shanks with freedom for rotary and endwise adjustment thereof.

19. In combination, a vehicle body having a curvilinear outer wall provided with an opening, a door for said opening and a pair of vertically spaced hinges for said door secured to edge portions of said body and door adjacent the opening, each hinge comprising attaching plates and a ball ended shank adjustably mounted on one of said attaching plates and having a swivel fit in a socket provided therefor in the other of said attaching plates, whereby the two ball ends and sockets therefor provide two points of hinge suspension for the door which determine the hinging axis in a predetermined angular relationship to the edge of the door, and whereby the adjustment of one or both of said shanks relative to the attaching plates changes the angular relationship between the hinging axis and the door without affecting the swivel action of the ball ends in the sockets, so that the door is swingable to and from closed position without binding.

20. A pair of ball and socket hinges for mounting a door in an opening in a vehicle body, each hinge comprising a socket member secured to one of said door and body, and a ball head member comprising a substantially horizontally disposed shank with a ball head on one end thereof operating in the socket of the socket member with a swivel fit, the other end of the shank being the attaching end and disposed in a plane substantially parallel with the outside surfaces of the door and body, and means for securing the attaching ends of said shanks to the other of said door and body with freedom for rotary and endwise adjustment thereof to fit the door in the opening in the body.

21. A pair of vertically spaced ball and socket hinges for hingedly mounting a door on a vehicle body and adjusting it relative to the body in the door opening provided in said body, the door adapted to fit the opening in the body with small clearance so as to permit small scale adjustment of the door in the opening by means of said hinges in assembling on the body, each hinge comprising a ball head member having an attaching shank extending from the ball head, and a socket member wherein the ball head is received with a swivel fit and retained in all positions which the ball head member may assume relative to the socket member, said socket member having a slot provided therein through which the shank of the ball head member extends for relative angular movement through approximately 90° in a substantially horizontal plane in the opening and closing of the door, said slot being wide enough in relation to the thickness of the shank to provide clearance above and below the same so that the shank may in the final assembled position of the door on the body be positioned at an acute angle to the hinging axis of the door, and means for securing the socket member to one of said door and body and the shank of the ball head member to the other of said door and body, the attaching shank having its end remote from the ball head threaded for endwise adjustment of the ball head member with respect to the associated one of the door and body on which the ball head member is mounted.

22. A pair of vertically spaced ball and socket hinges for hingedly mounting a door on a vehicle body and adjusting it relative to the body in the door opening provided in said body, the door adapted to fit the opening in the body with small clearance so as to permit small scale adjustment of the door in the opening by means of said hinges in assembling on the body, each hinge comprising a ball head member having an attaching shank extending from the ball head, and a socket member wherein the ball head is received with a swivel fit and retained in all positions which the ball head member may assume relative to the socket member, said socket member having a slot provided therein through which the shank of the ball head member extends for relative angular movement through approximately 90° in a substantially horizontal plane in the opening and closing of the door, said slot being wide enough in relation to the thickness of the shank to provide clearance above and below the same so that the shank may in the final assembled position of the door on the body be positioned at an acute angle to the hinging axis of the door, and means for securing the socket member to one of said door and body and the shank of the ball head member to the other of said door and body, the ball head member having its attaching shank adjustable endwise with respect to the means for securing the same to the associated one of the door and body on which said ball head member is mounted.

23. In combination, a vehicle body having a door opening provided therein, a door adapted to close said opening, said door and body having corresponding outside curvature and the door being adapted to fit said opening with small clearance so as to permit only small scale adjustment of the door in the opening in assembling the door on the body, and a pair of vertically spaced hinges for hingedly connecting the door to the body so as to permit such adjustment without causing the door to bind at the hinges in opening and closing, each of said hinges comprising two members, one having a shank extending through a slot provided in the other member for relative angular movement through approximately 90° in a substantially horizontal plane in the opening and closing of the door, said slot being wide enough in relation to the thickness of the shank to provide clearance above and below the same so that the shank may in the final assembled position of the door on the body be positioned at an acute angle to the hinging axis of the door, said two members being interconnected and providing a universal joint connection between the door and body, the two universal joint connections so provided establishing an upright hinging axis for the door, which axis is on a line passing through the two points of hinge suspension, the hinge members on the door being adjustable relative thereto and projecting from the edge of the door to locate the two points of hinge suspension outwardly relative to the edge of the door so that the hinging axis determined by these two points is laterally spaced relative to the edge of the door, and said universal joint connections being constructed so as to operate without binding irrespective of a change in the relationship of the door to the axis due to an adjustment of either or both of said hinges.

24. In combination, a vehicle body having a curvilinear outer wall provided with an opening, a door for said opening and a pair of vertically spaced hinges for said door secured to edge portions of said body and door adjacent the opening, each hinge comprising attaching plates and a ball ended shank adjustably mounted on one of said attaching plates and extending through a slot provided therefor in the other of said attaching plates for relative angular movement through approximately 90° in a substantially horizontal plane in the opening and closing of the door, said slot being wide enough in relation to the thickness of the shank to provide clearance above and below the same so that the shank may in the final assembled position of the door on the body be positioned at an acute angle to the hinging axis of the door, the ball end of said shank having a swivel fit in a socket provided therefor in the slotted attaching plate, whereby the two ball ends and sockets therefor provide two points of hinge suspension for the door which determine the hinging axis in a predetermined angular relationship to the edge of the door, and whereby the adjustment of one or both of said shanks relative to the attaching plates changes the angular relationship between the hinging axis and the door without affecting the swivel action of the ball ends in the sockets, so that the door is swingable to and from closed position without binding.

FRANK M. SMITH.

CERTIFICATE OF CORRECTION.

Reissue No. 21,231. October 10, 1939.

FRANK M. SMITH.

It is hereby certified that error appears in the printed specification of the above numbered patent requiring correction as follows: Page 3, second column, line 50, claim 1, for the word "points" read joints; page 4, first column, line 69, claim 10, for "thereaded" read threaded; and that the said Letters Patent should be read with this correction therein that the same may conform to the record of the case in the Patent Office.

Signed and sealed this 14th day of November, A. D. 1939.

Henry Van Arsdale,
Acting Commissioner of Patents.

(Seal)